M. SAMPPI.
MULTIPLE HORSE HOLDER AND RELEASER.
APPLICATION FILED MAY 20, 1918.
1,285,403. Patented Nov. 19, 1918.
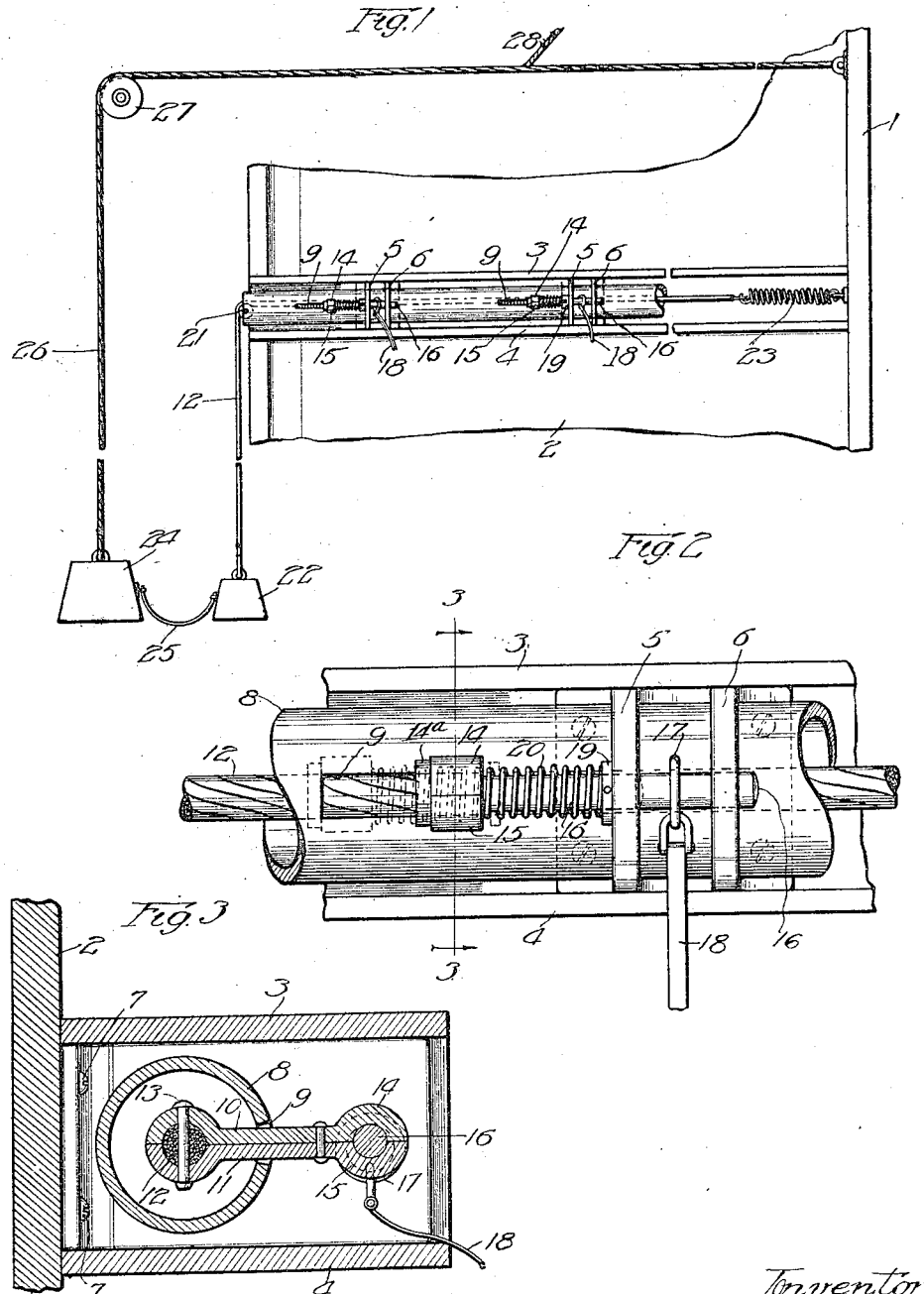

UNITED STATES PATENT OFFICE.

MICHAEL SAMPPI, OF ROCKFORD, ILLINOIS.

MULTIPLE HORSE HOLDER AND RELEASER.

1,285,403.　　　　Specification of Letters Patent.　　Patented Nov. 19, 1918.

Application filed May 20, 1918. Serial No. 235,625.

*To all whom it may concern:*

Be it known that I, MICHAEL SAMPPI, a citizen of Finland, residing at Rockford, in the county of Winnebago, in the State of Illinois, have invented certain new and useful Improvements in Multiple Horse Holders and Releasers, of which the following is a specification.

This invention relates to improvements in multiple horse holders and releasers and its object primarily is to provide means for normally securing a number of animals in a series of stalls in a stable and for automatically releasing them in time of necessity. A further object is to provide a device of this type that is simple in construction, efficient in operation and cheap to manufacture. With the foregoing and other objects in view the invention consists in the combination and arrangement of parts to be hereinafter fully described, pointed out in the appended claims and illustrated in the accompanying drawing which forms a part of said specification and in which—

Figure 1 is a view of my improved device in front elevation illustrating its application.

Fig. 2 is an enlarged fragmentary view.

Fig. 3 is a cross section taken on line 3—3 of Fig. 2.

Like reference characters denote corresponding parts throughout.

The reference numeral 1 denotes a barn provided with the usual stalls 2. Through the several stalls of the barn I provide a pair of parallel spaced bars 3, 4 which are connected in each stall by the angular guides 5, 6 which are spaced apart and secured to the manger wall 2 by the screws 7. Extending longitudinally through the several stalls between the bars 3, 4 and through the several guides 5, 6 is a tubular member 8 which is formed in each stall with a longitudinal slot 9 and through each of said slots 9 a pair of arms 10, 11 extend, said arms being secured together and to a cable 12, which extends entirely through and beyond the said member 8, by means of the bolts 13. The outer ends of the said arms 10, 11 are formed with the enlargements 14, 15 which are secured about the bolts 16 each of which extend through a pair of the spaced guides 5, 6 and carry the rings 17 whereon the hitching straps 18 are carried. Each bolt 16 carries a collar 14ª, which abuts the arm enlargements 14, 15, and a stop collar 19 which limits its movement through the guide 5 in one direction and a spring 20 encircling said bolt 16 abuts the said stop collar and the said arm-enlargements 14, 15 to yieldingly space said last named members the maximum distance from the guides 5.

To one end of the tubular member 8 a pulley 21 is arranged which serves as a guide for the said cable 12, said cable at one end carrying a weight 22 and at its other end being connected by a contractile spring 23 to the barn wall 1. To the weight 22 another weight 24 is secured by a metal link 25, said weight 24 being carried by a cord 26 which runs over a suitable guide pulley 27 and is secured to the wall 1, a cord 28 secured to the cord 26 runs to an emergency barn door (not shown) which door is provided with a spring adapted to yieldingly open the same. To release one animal at a time the hitching strap 18 is disconnected from the bit in the usual manner. To release all of the animals simultaneously the cord 26 is severed or it may be burned in the case of fire. This operation will cause the weights 24, 22 to overcome the resistance of spring 23 and retract the cable 12 which will move the several arms 10, 11, aided by the springs 20, thus withdrawing the bolts 16 from the guides 5, 6 and dropping the rings 17. The spring-pressed emergency door when no longer held shut by the weight 24 will be forced open by its spring so that the animals may escape from the building after being freed from their stalls.

What is claimed is:—

1. In a multiple horse holder and releaser, a plurality of angular guides arranged in pairs the members of which are spaced apart, a longitudinally slotted tubular member supported in said angular guides, a cable extending through the said tubular member, a weight carried by said cable, another weight supported by a fusible cord, a non-fusible link connecting said weights, connection for one end of said cable whereby longitudinal movement of the same through the said tubular member is yieldingly prevented, pairs of arms connected to said cable and extending through the slots in said tubular member, bolts carried by said pairs of arms and normally connecting the component members of the said pairs of angular guides, and means arranged upon said bolts and abutting one of the component members of the said pairs of angular guides and the said pairs of arms whereby said members are spaced away from each other.

2. In a multiple horse holder and releaser, a plurality of angular guides arranged in pairs the members of which are spaced apart, a longitudinally slotted tubular member supported in said angular guides, a cable extending through the said tubular member, a weight carried by said cable, another weight supported by a fusible cord, a nonfusible link connecting said weights, a spring connected to one end of said cable for yieldingly preventing longitudinal movement of the same through said tubular member, pairs of arms connected to each other and to the said cable and extending through the slots in said tubular member, bolts carried by said pairs of arms and normally connecting the component members of the said pairs of angular guides, stop collars carried by said bolts, and expansion springs arranged upon said bolts and abutting said stop collars and the said pairs of arms.

In testimony that I claim the foregoing as my own I have hereto affixed my signature in the presence of two subscribing witnesses.

MICHAEL SAMPPI.

Witnesses:
SWAN LINDSKOLD.
WIKTAR JAHNSAN.

Copies of this patent may be obtained for five cents each, by addressing the "Commissioner of Patents, Washington, D. C."